United States Patent
Ramakrishnan et al.

(10) Patent No.: US 11,873,738 B2
(45) Date of Patent: Jan. 16, 2024

(54) INTEGRATED STATOR-FAN FRAME ASSEMBLY

(71) Applicant: General Electric Company, Schenectady, NY (US)

(72) Inventors: Kishore Ramakrishnan, Rexford, NY (US); Li Zheng, Niskayuna, NY (US); Nicholas J. Kray, West Chester, OH (US); Trevor H. Wood, Clifton Park, NY (US); Bugra H. Ertas, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/561,422

(22) Filed: Dec. 23, 2021

(65) Prior Publication Data

US 2023/0203957 A1 Jun. 29, 2023

(51) Int. Cl.
*F01D 9/04* (2006.01)
*F01D 25/24* (2006.01)

(52) U.S. Cl.
CPC ............ *F01D 9/041* (2013.01); *F01D 9/042* (2013.01); *F01D 25/24* (2013.01); *F05D 2230/23* (2013.01); *F05D 2240/121* (2013.01); *F05D 2240/122* (2013.01); *F05D 2240/14* (2013.01); *F05D 2260/36* (2013.01)

(58) Field of Classification Search
CPC .......... F01D 9/041; F01D 9/042; F01D 25/24; F05D 2230/23; F05D 2240/121; F05D 2240/122; F05D 2240/14; F05D 2260/36
See application file for complete search history.

(56) References Cited

U.S. PATENT DOCUMENTS

| | | | |
|---|---|---|---|
| 1,118,507 A | 11/1914 | Meyer | |
| 6,195,983 B1 | 3/2001 | Wadia et al. | |
| 6,619,916 B1 | 9/2003 | Capozzi et al. | |
| 7,549,839 B2 | 6/2009 | Carroll et al. | |
| 8,221,071 B2 | 7/2012 | Wojno et al. | |
| 9,068,460 B2 * | 6/2015 | Suciu | F01D 1/04 |
| 9,683,488 B2 | 6/2017 | Ress, Jr. et al. | |
| 9,932,858 B2 | 4/2018 | Miller et al. | |
| 10,697,471 B2 * | 6/2020 | Northall | F01D 25/162 |
| 10,808,621 B2 | 10/2020 | Veiga | |
| 11,125,090 B2 * | 9/2021 | Miyahisa | F01D 5/141 |
| 2017/0370290 A1 * | 12/2017 | Bradbrook | F02K 3/06 |

(Continued)

FOREIGN PATENT DOCUMENTS

| | | | | |
|---|---|---|---|---|
| EP | 1744014 | | 1/2007 | |
| FR | 3085414 A1 * | | 3/2020 | F01D 5/147 |

(Continued)

*Primary Examiner* — Courtney D Heinle
*Assistant Examiner* — Danielle M. Christensen
(74) *Attorney, Agent, or Firm* — HANLEY, FLIGHT & ZIMMERMAN, LLC

(57) ABSTRACT

Methods, apparatus, systems, and articles of manufacture are disclosed to implement an integrated stator-fan frame assembly. An integrated fan exit stator-fan frame strut assembly for a gas turbine engine includes a fan exit stator portion having an airfoil including a leading edge and a trailing edge, and a fan frame strut portion including a leading edge and a trailing edge, the leading edge of the fan frame strut portion aerodynamically integrated with the trailing edge of the fan exit stator portion.

22 Claims, 5 Drawing Sheets

(56) References Cited

U.S. PATENT DOCUMENTS

2018/0038235 A1\* 2/2018 Damevin .............. F04D 29/667
2020/0024986 A1 1/2020 Di Mare et al.

FOREIGN PATENT DOCUMENTS

| FR | 3129428 | 5/2023 | | |
|----|---------|--------|---|---|
| FR | 3129432 | 5/2023 | | |
| FR | 3130879 | 6/2023 | | |
| FR | 3130894 | 6/2023 | | |
| WO | WO-2021123146 A1 \* | 6/2021 | ........... | F01D 17/162 |

\* cited by examiner

INTEGRATED STATOR-FAN FRAME ASSEMBLY

FIELD OF THE DISCLOSURE

This disclosure relates generally to gas turbines and, more particularly, to an integrated stator-fan frame assembly.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

Figure 1:
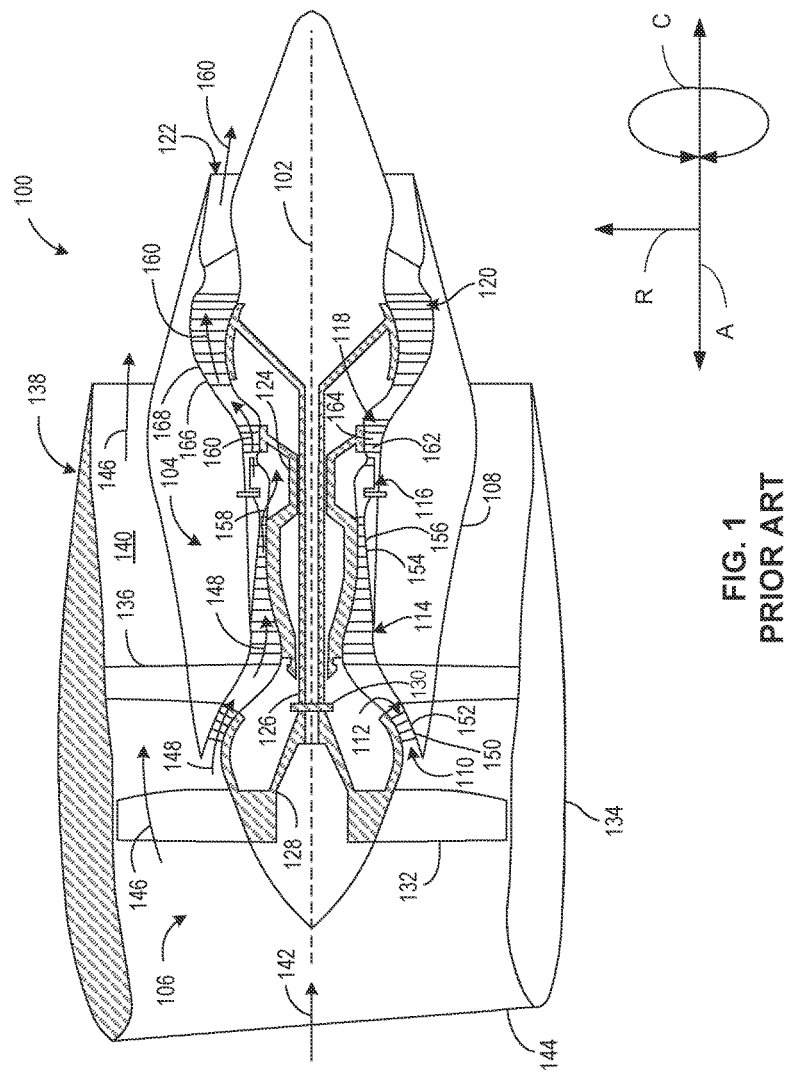
FIG. 1 illustrates an example gas turbine engine.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially the same size" refers to dimensions that may not be exactly identical due to manufacturing tolerances and/or other real world imperfections. Thus, unless otherwise specified, "substantially the same size" refers to +/−10 percent of a dimension. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

DETAILED DESCRIPTION

Many known technologies are directed to decreasing the mass of a gas turbine engine while at least maintaining technical specifications and/or performance. For example, some technologies may be directed to decreasing the mass of one or more components by use of advanced materials (e.g., composites). In other examples, technologies may be directed to decreasing a size of one or more components in order to reduce mass. Examples disclosed herein can provide for a reduced length and, thus, mass of a low pressure shaft and/or fan shaft of a gas turbine engine while maintaining technical performance of the gas turbine engine by implementing an integrated fan exit stator-fan frame strut assembly. Other known technologies are directed to increasing gas turbine engine performance. For example, some technologies may be directed to increasing performance (e.g., thrust, fuel economy, etc.) of a gas turbine engine while maintaining a given package size (e.g., diameter of a fan casing).

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe an example implementation and not to be taken limiting on the scope of the subject matter described in this disclosure. Certain features from different aspects of the following description may be combined to form yet new aspects of the subject matter discussed below.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the turbofan 100. As used herein, "lateral" refers to the direction perpendicular to the axial vertical directions (e.g., into and out of the plane of FIGS. 1, 2, etc.).

Various terms are used herein to describe the orientation of features. As used herein, the orientation of features, forces and moments are described with reference to the axial direction, radial direction, and circumferential direction of the vehicle associated with the features, forces and moments. In general, the attached figures are annotated with a set of axes including the axial axis A, the radial axis R, and the circumferential axis C. Additionally or alternatively, the attached figures are annotated with a set of axes including the roll axis R, the pitch axis P, and the yaw axis Y.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Gas turbine engines include a fan section proximate an intake of an engine. The fan section includes a plurality of circumferentially spaced apart fan blades. A rotating portion of the fan section including the fan blades is rotatably coupled to a low pressure (LP) compressor (e.g., booster) via an LP shaft. In some examples, the LP shaft includes an LP shaft portion and a fan shaft portion. To facilitate channeling the airflow from the fan section into the LP compressor, some known gas turbine engines include a plurality of circumferentially spaced apart fan exit stators. In some known gas turbine engines, a reduction gearbox is employed to couple the LP shaft and the fan shaft while reducing the speed of the fan shaft relative to the LP shaft. Such reduction of the speed of the fan shaft allows for a reduced fan blade tip speed. However, due to packaging of the reduction gearbox, such gas turbine engines have an axial space between the fan exit stator and the LP compressor. As such, a fan frame strut is employed to support the air flow path between the fan exit stator and the LP compressor. In some examples, the fan frame strut is adjacent to the fan exit stator, axially disposed downstream within the air flow path. Examples disclosed herein aerodynamically integrate the fan frame strut with the fan exit stator into a stator-strut assembly. Examples disclosed herein reduce a length of a fan shaft by integrating the fan frame strut with the fan exit stator. Examples disclosed herein reduce a length of a gas turbine engine by reducing the length of the fan shaft. Example disclosed herein increase a duct area downstream of a fan section, thus reducing a flow velocity of air through the duct and duct skin friction losses.

Reference now will be made in detail to examples of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one example can be used with another example to yield a still further example. Thus, it is intended that the present disclosure covers such modifications and variations as come within the scope of the appended claims and their equivalents.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the annular inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan (e.g., turbofan 100), and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2:
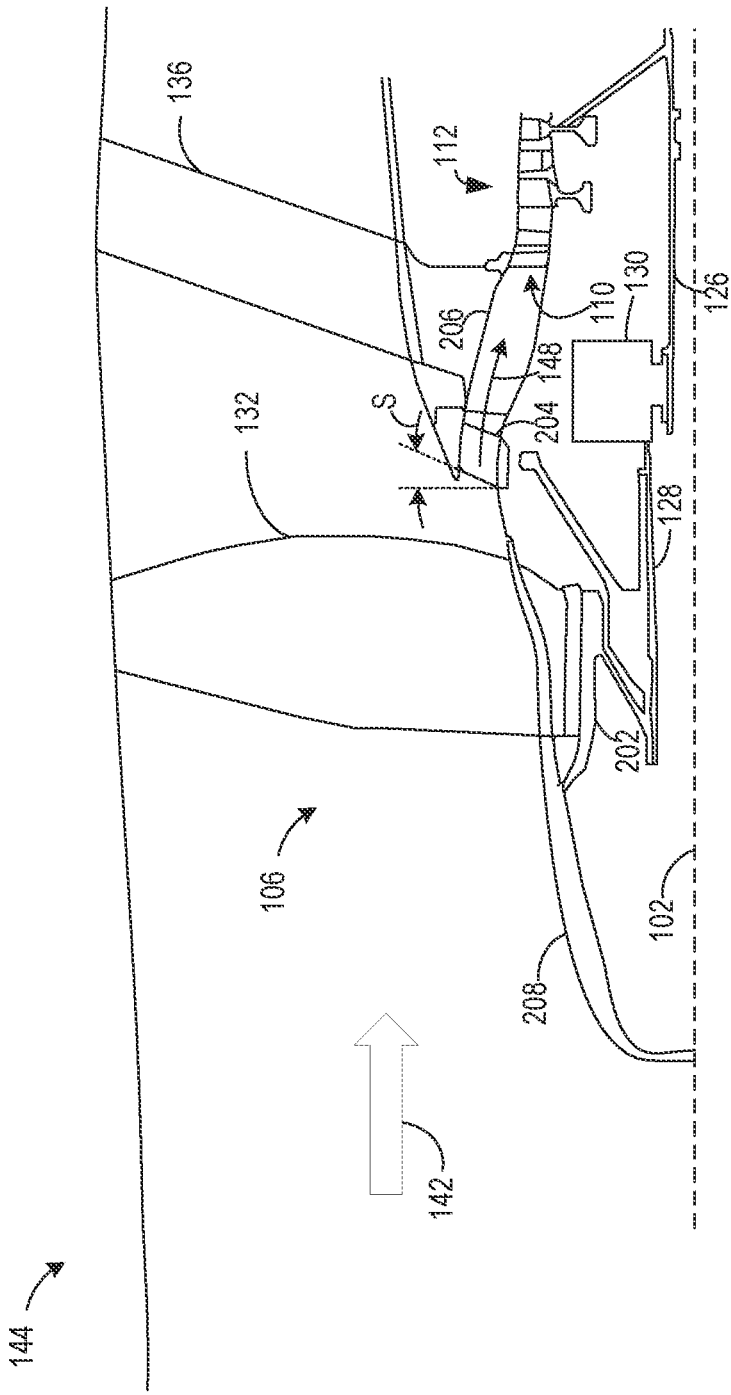
FIG. 2 illustrates prior art including an example cross-sectional side view of a first example inlet section of the example gas turbine engine.
Figure 2:
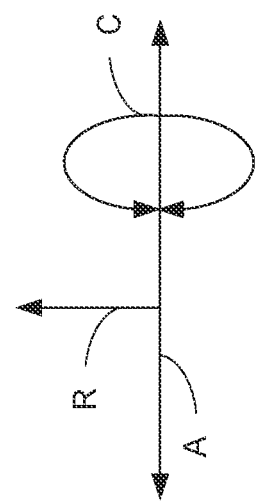

FIG. 2 illustrates an example inlet portion 144 that can be implemented in the example turbofan 100 shown in FIG. 1. The example inlet portion 144 includes the fan section 106 which is rotated about the centerline axis 102 by the fan shaft 128 powered by the LP turbine 120 (not shown). The fan section 106 includes a rotor disk 202 from which extends radially outwardly a plurality of circumferentially spaced apart fan or rotor blades 132 (only one shown in FIG. 2). The fan blades 132 may be metallic or nonmetallic. For example, the fan blades 132 may be made from a carbon fiber-epoxy composite or other similar material. The example fan section 106 of FIG. 2 includes a fan exit stator (FES) 204. The FES 204 directs the second portion 148 of the air 142 into the annular inlet 110 of the LP compressor 112. The FES 204 includes an airfoil to direct the second portion 148 of the air 142. The airfoil includes a leading edge proximate the fan blade 132, a trailing edge axially disposed from the leading edge, and a set of two surfaces disposed between the leading edge and the trailing edge. The leading edge of the FES 204 of FIG. 2 is axially swept (e.g., non-perpendicular to the central axis 102) at an angle S. In some examples, the angle of sweep, S, of the leading edge of the FES 204 can range from 0 degrees to 40 degrees aft. In some examples, the leading edge of the FES 204 is not axially swept (e.g., angle of sweep, S, is zero).

In some examples, the FES 204 is symmetrical (e.g., the two surfaces are symmetric). In other examples, the FES 204 has a camber (e.g., the two surfaces are asymmetric). Additionally, a distance between the two surfaces defines a thickness of the airfoil of the FES 204. A distance between the leading edge and the trailing edge of the FES 204 defines a chord of the FES 204. The angle of sweep, camber and/or a thickness-to-chord ratio of the airfoil of the FES 204 can define a shape of the FES 204. While in the example of FIG. 2, a single FES 204 is shown, an example turbofan (e.g., the turbofan 100 of FIG. 1) may include a plurality of circumferentially spaced FES 204. In some examples, each of the plurality of FES 204 has the same shape (e.g., sweep, camber, and/or thickness). In other examples, a first portion of the FES 204 has a first shape and a second portion of the FES 204 has a second shape. In other examples, each of the FES 204 of the example turbofan 100 has a unique shape (e.g., none of the FES 204 have the same shape).

While the example inlet portion 144 of FIG. 2 includes one FES 204, a turbofan (e.g., the turbofan 100 of FIG. 1) can include a plurality of circumferentially spaced FESs 204. The example inlet portion 144 includes one of the circumferentially-spaced apart outlet guide vanes 136. A spinner 208 is joined to a forward end of the rotor disk 202 to provide an aerodynamic flow path for the air 142 entering the fan section 106.

Disposed downstream of the fan section 106 is the reduction gearbox 130. The example reduction gearbox 130 couples the LP shaft 126 and the fan shaft 128 while reducing the speed of the fan shaft 128 relative to the LP shaft 126 by a reduction ratio (e.g., 2:1, 4:1, etc.). Radially outward of the reduction gearbox 130 is an example fan frame strut 206. The example fan frame strut 206 is disposed downstream of the FES 204 with an axial gap between the trailing edge of the FES 204 and a leading edge of the fan frame strut 206. The example fan frame strut 206 supports loads of the fan section 106 between the FES 204 and the LP compressor 112. Because of the integration of the reduction gearbox 130, the example inlet portion 144 includes an axial break between the FES 204 and the LP compressor 112. The fan frame strut 206 supports the LP flow path for the second portion 148 of the air 142 between the FES 204 and the LP compressor 112. The example fan frame strut 206 includes an airfoil including the leading edge proximate the trailing edge of the FES 204 and a trailing edge disposed downstream of the leading edge and a set of two surfaces between the leading edge and the trailing edge. In some examples, because the fan frame strut 206 supports load, the leading edge of the fan frame strut 206 may be substantially perpendicular (e.g., within 5 degrees) of the centerline axis 102.

In some examples, the fan frame strut 206 is symmetrical (e.g., the two surfaces are symmetric). In some examples, the fan frame strut has a camber (e.g., the two surfaces are asymmetric). Additionally, a distance between the two surfaces defines a thickness of the airfoil of the fan frame strut 206. A distance between the leading edge and the trailing edge of the fan frame strut 206 defines a chord of the fan frame strut 206. The camber and/or a thickness-to-chord ratio of the airfoil of the fan frame strut 206 can define a shape of the fan frame strut 206. While in the example of FIG. 2, a single fan frame strut 206 is shown, an example turbofan (e.g., the turbofan 100 of FIG. 1) may include a plurality of circumferentially spaced fan frame struts 206. In some examples, each of the fan frame struts 206 has the same camber and thickness-to-chord ratio (e.g., a thickness-to-chord ratio of 10%). In other examples, a first portion of the plurality of the fan frame struts 206 can have a first camber and a first thickness-to-chord ratio (e.g., 5%) while a second portion of the plurality of the fan frame struts 206 has a second camber and a second thickness-to-chord ratio (e.g., 20%). In some examples, a number of fan frame struts 206 in a turbofan (e.g., the turbofan 100) is less than a number of FESs 204 of the turbofan. Disposed downstream of the reduction gearbox 130 is the LP compressor 112 having axially spaced apart vane and blade rows, with the blades thereof being joined to the LP shaft 126.

Figure 3:
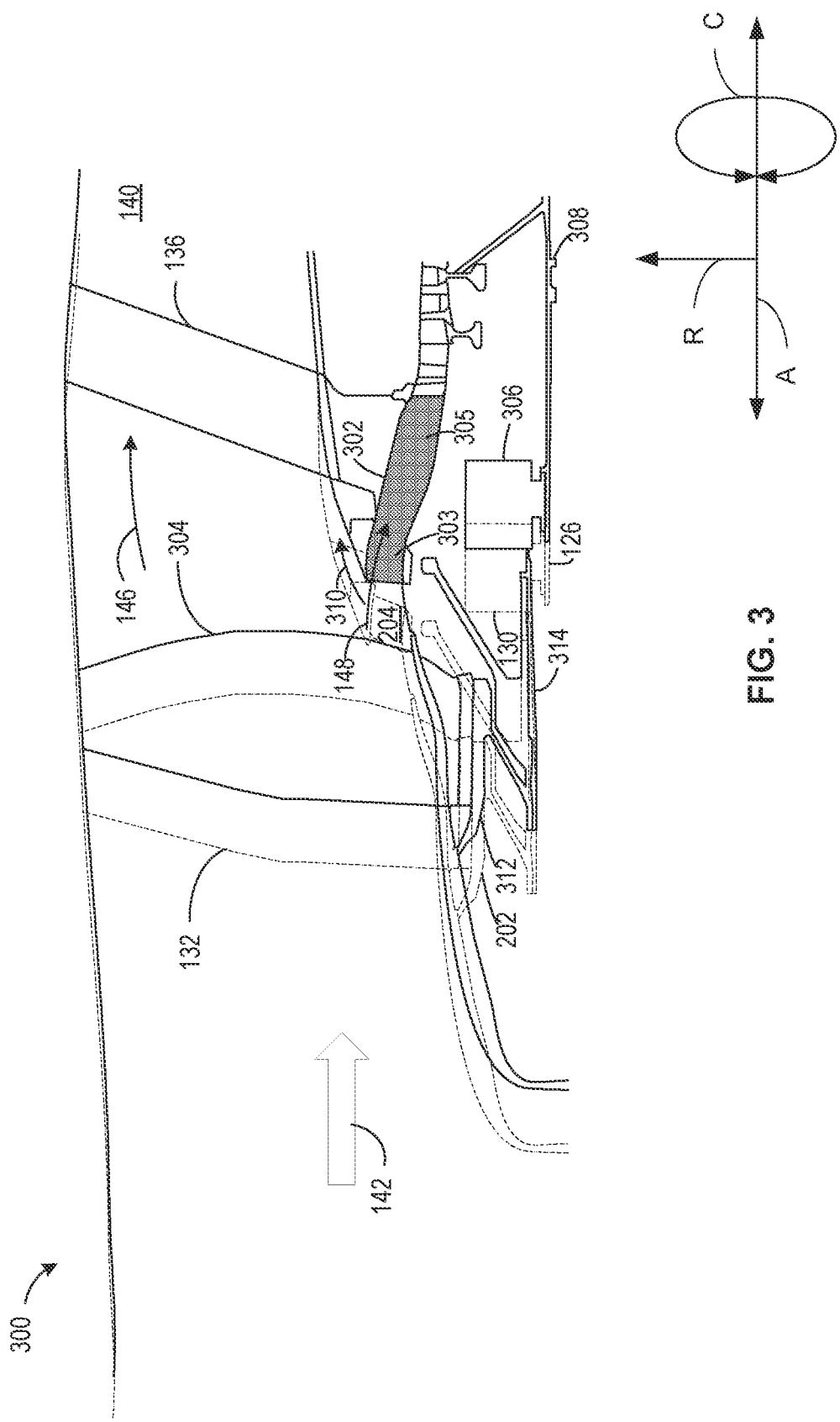
FIG. 3 illustrates an example cross-sectional side view of a second example inlet section of the example gas turbine engine including an integrated fan exit stator (FES)-fan frame strut.

FIG. 3 illustrates a second example inlet portion 300 that can be implemented in the example turbofan 100 shown in FIG. 1. For comparison, the position of the components of the inlet portion 144 of FIG. 2 is illustrated in FIG. 3 using dashed lines. The solid lines of FIG. 3 represent the components of the inlet portion 300. The example inlet portion 300 includes an example integrated FES-fan frame strut 302. In the example of FIG. 3, the integrated FES-fan frame strut 302 includes an FES portion 303 and a fan frame strut portion 305. The FES portion 303 is proximate fan blade 304 while the fan frame strut portion 305 is downstream of the FES portion 303. A trailing edge of the FES portion 303 is aerodynamically integrated with a leading edge of the fan frame strut portion 305 of the integrated FES-fan frame strut 302. As such, the FES portion 303 is aerodynamically integrated with the fan frame strut portion 305. For example, there is a continuous flow path for the second portion 148 of the air 142 around the integrated FES-fan frame strut 302. The example integrated FES-fan frame strut 302 includes an aerodynamically continuous set of two surfaces extending from a leading edge (e.g., the leading edge of the FES portion 303) to a trailing edge (e.g., the trailing edge of the fan frame strut portion 305). The set of two surfaces of the example integrated FES-fan frame strut 302 can define a camber and a thickness of the example integrated FES-fan frame strut 302. Additionally, the camber and/or the thickness of the example integrated FES-fan frame strut 302 can define a shape of the integrated FES-fan frame strut 302.

In the example of FIG. 3, the FES portion 303 and the fan frame strut portion 305 of the integrated FES-fan frame strut 302 are mechanically integrated. In some examples, the mechanical integration of the integrated FES-fan frame strut 302 is separable (e.g., using adhesive, bolts, etc.) such that the fan section 106 can be separated from components of the core turbine 104 (e.g., the LP compressor 112) as needed (e.g., for repair or replacement of components of the fan section 106 and/or the core turbine 104). In other examples, the mechanical integration of the integrated FES-fan frame strut 302 is not separable (e.g., welded, single piece construction, etc.).

As explained above with respect to FIG. 2, the inlet portion 144 can include a plurality of FES 204 and a plurality of fan frame struts 206 with the number of FES 204 greater than the number of fan frame struts 206. In the example of FIG. 3, each portion of the inlet portion 300 which would contain a fan frame strut 206 instead contains one of the integrated FES-fan frame strut 302. Thus, an example gas turbine engine (e.g., the turbofan 100) implementing the inlet portion 300 includes a plurality of the integrated FES-fan frame struts 302. However, because the number of FES 204 is greater than the number of fan frame struts 206, only a first portion of the FES 204 are integrated into one of the integrated FES-fan frame strut 302. A second portion of the plurality of the FES 204 are not integrated with a fan frame strut 206. This relationship is described below in connection with FIG. 4. In some examples, each of the plurality of the integrated FES-fan frame struts 302 has the same shape. In other examples, a first portion of the plurality of the integrated FES-fan frame struts 302 has a first shape and a second portion of the plurality of the integrated FES-fan frame struts 302 has a second shape. In some examples, each of the example integrated FES-fan frame struts 302 has a unique shape compared to each of the other example integrated FES-fan frame struts 302.

In the example of FIG. 3, due to the integration of each of the fan frame struts with a portion of the plurality of FES 204 into the integrated FES-fan frame struts 302, the axial gap between the FES 204 and the fan frame strut 206 is eliminated. As such, the remaining FES 204 (e.g., the second portion of the plurality of the FES 204) can be located aft (e.g., downstream along the axis A) of the FES 204 of FIG. 2. As a result of the aft positioning of the remaining FES 204, additional components of the inlet portion 300 can be positioned aft compared to the counterpart components shown in FIG. 2. For example, fan blade 304 of FIG. 3 is aft of the fan blade 132 of FIG. 2. Additionally, the reduction gearbox 306 of FIG. 3 is aft of the reduction gearbox 130 of FIG. 2. As a result of the aft positioning of some components of the inlet portion 300, additional components of the inlet portion 300 can be reduced in size compared to the counterpart components shown in FIG. 2. For example, a foremost point of LP shaft 308 of FIG. 3 is aft compared to the foremost point of the LP shaft 126 of FIG. 2. As a result, a length of the LP shaft 308 is reduced compared to the LP shaft 126. As a result of the reduced length of the LP shaft 308, the LP shaft 308 can have a reduced mass compared to the LP shaft 126. Further, as a result of the reduced length of the LP shaft 308, an overall length of a fan casing (e.g., the nacelle 134 of FIG. 1) can also be reduced, thus reducing an overall mass of the gas turbine engine (e.g., the turbofan 100). Additionally, as a result of the reduced length of the LP shaft 308, the LP shaft 308 may have an increased critical frequency (e.g., natural frequency). In some examples, increased critical frequency of the LP shaft 308 can allow for increased speed of a gas turbine engine (e.g., the turbofan 100). In other examples, the increased critical frequency of the LP shaft 308 can increase a resistance of the turbofan 100 to engine dynamics and vibration risks.

As a result of the aft positioning of the FES 204 of the inlet portion 300 of FIG. 3, an additional flowpath 310 is opened up to the bypass airflow passage 140 downstream of the fan section 106. In other words, as a result of the aft positioning of the FES 204, a duct area downstream of the fan section 106 is increased. As a result of the increased duct area, a flow velocity of the air moving through the duct area is decreased and, thus, duct skin friction losses are also reduced.

In some examples, implementation of the plurality of the integrated FES-fan frame struts 302 can be combined with one or more other technologies to further reduce mass and/or increase technical performance of a gas turbine engine (e.g., the turbofan 100). For example, the fan blade 304 may implemented a shortened dovetail blade root such as that described in Zheng et al., U.S. patent application Ser. No. 17/535,291, which is hereby incorporated by reference in its entirety. By implementing the shortened dovetail blade root, rotor disk 312 can be positioned aft of the position shown with respect to the inlet portion 300 of FIG. 3. As such, fan shaft 314 can have a reduced length compared to the fan shaft 128 of the inlet portion 144 of FIG. 2. As a result of the reduced length of the fan shaft 314, the fan shaft 314 can have a reduced mass compared to the fan shaft 128. Additionally, as a result of the reduced length of the fan shaft 314, an overall length of the fan casing (e.g., the nacelle 134 of FIG. 1) can also be reduced.

Figure 4:
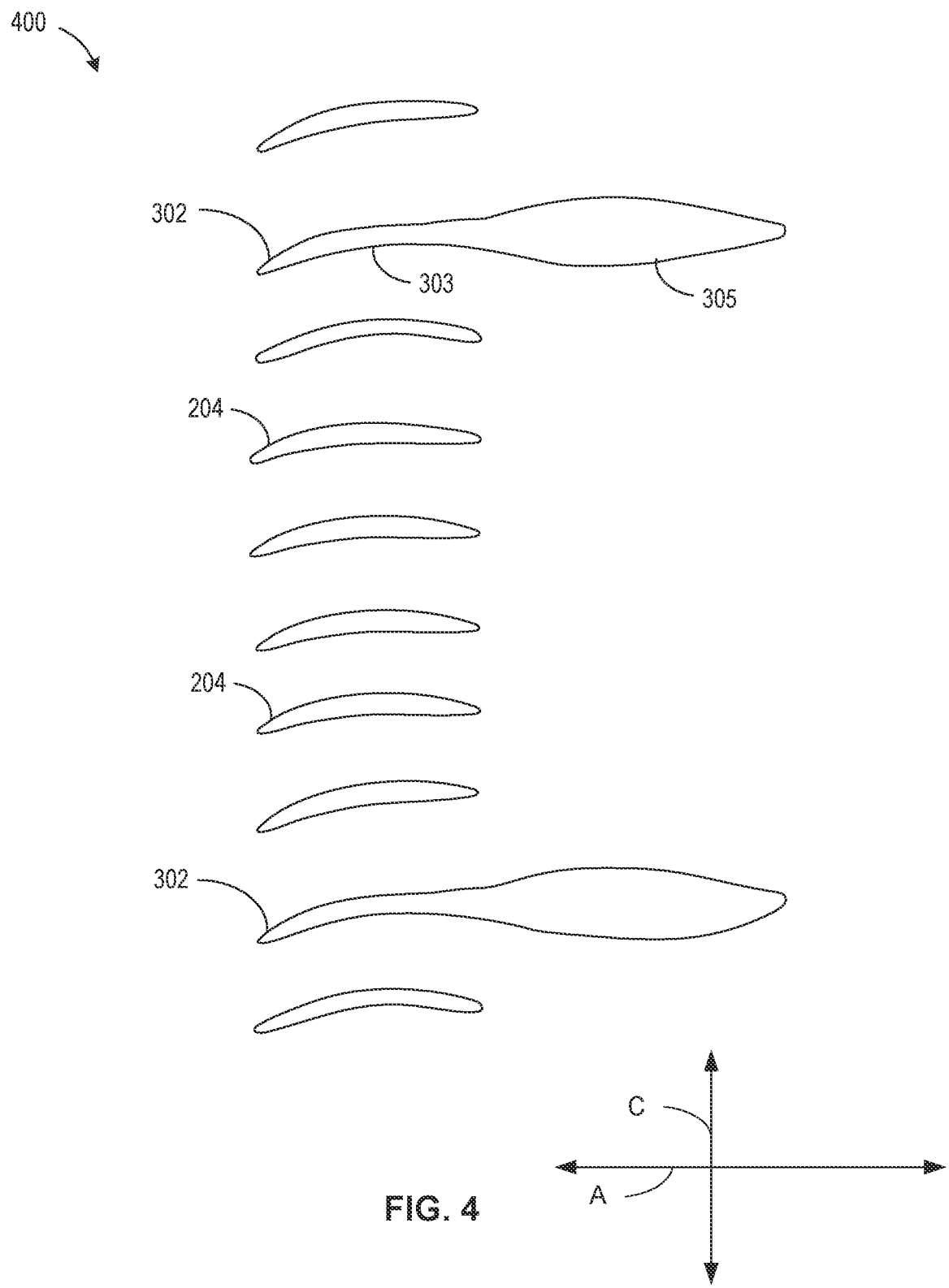
FIG. 4 illustrates an unwrapped view a portion of the second example inlet section of FIG. 3 including the integrated FES-fan frame struts.

FIG. 4 includes a view 400 illustrating a portion of the inlet portion 300 unwrapped along the circumferential axis C. The example view 400 includes a plurality of the integrated FES-fan frame struts 302 and a plurality of the FESs 204. Each of the integrated FES-fan frame struts 302 includes the FES portion 303 and the fan frame strut portion 305. As described above in connection with FIG. 3, a first portion of the plurality of FES 204 are integrated into the integrated FES-fan frame struts 302 as the FES portion 303. A second portion of the plurality of the FES 204 are not integrated into an integrated FES-fan frame strut 302.

In the example of FIG. 4, each of the illustrated FES 204 has a unique shape. For example, the angle of sweep and/or the thickness of each of the FES 204 is not the same. Additionally, in the example of FIG. 4, a shape of the first example integrated FES-fan frame struts 302 is different than a shape of the second example integrated FES-fan frame strut 302. For example, a thickness-to-chord ratio of the second integrated FES-fan frame strut 302 is decreased compared to a thickness-to-chord ratio of the integrated FES-fan frame strut 302. The view 400 of FIG. 4 includes only a portion of the plurality of the integrated FES-fan frame struts 302 and the plurality of the FESs 204. For example, the example inlet portion 300 may include six total integrated FES-fan frame struts 302. In other examples, the example inlet portion 300 can include more or less than six integrated FES-fan frame struts 302. While the example integrated FES-fan frame struts 302 of FIG. 4 are illustrated as a unitary component, the FES portion 303 and the fan frame strut portion 305 may be mechanically separable as described in detail below in connection with FIGS. 5A, 5B, and 5C.

Figure 5A:
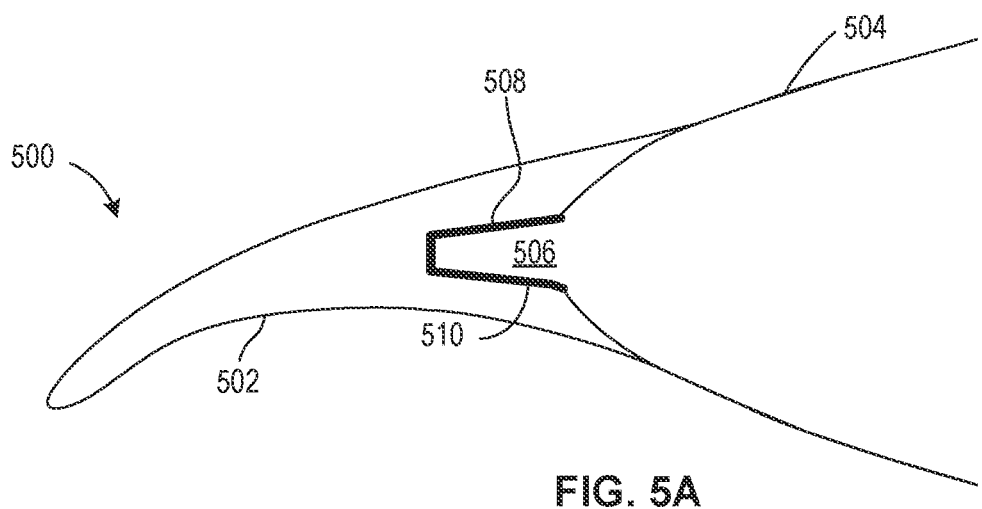
FIG. 5A illustrates a first example construction of a joint of a first example integrated FES-fan frame strut.

FIG. 5A illustrates a first example construction of a joint of a first example integrated FES-fan frame strut 500. As explained above, although it is advantageous for an FES (e.g., the FES 204) and a fan frame strut (e.g., the fan frame strut 206) to be aerodynamically integrated, it may also be advantageous for the FES 204 and the fan frame strut 206 to be mechanically separable for the purpose of repair of a gas turbine engine (e.g., the turbofan 100). The first example integrated FES-fan frame strut 500 includes an FES portion 502 and a fan frame strut portion 504. The fan frame strut portion 504 includes a tongue 506 along a leading edge of the fan frame strut portion 504. The tongue 506 is disposed within a cavity 508. The cavity 508 is a portion of the trailing edge of the FES portion 502. Disposed between the tongue 506 and the cavity 508 is an adhesive 510. The example adhesive 510 may be a semi-permanent structural adhesive (e.g., an epoxy adhesive) that provides structural rigidity to the joint of the first example integrated FES-fan frame strut 500 while allowing the FES portion 502 and the fan frame strut portion 504 to be mechanically separated.

Figure 5B:
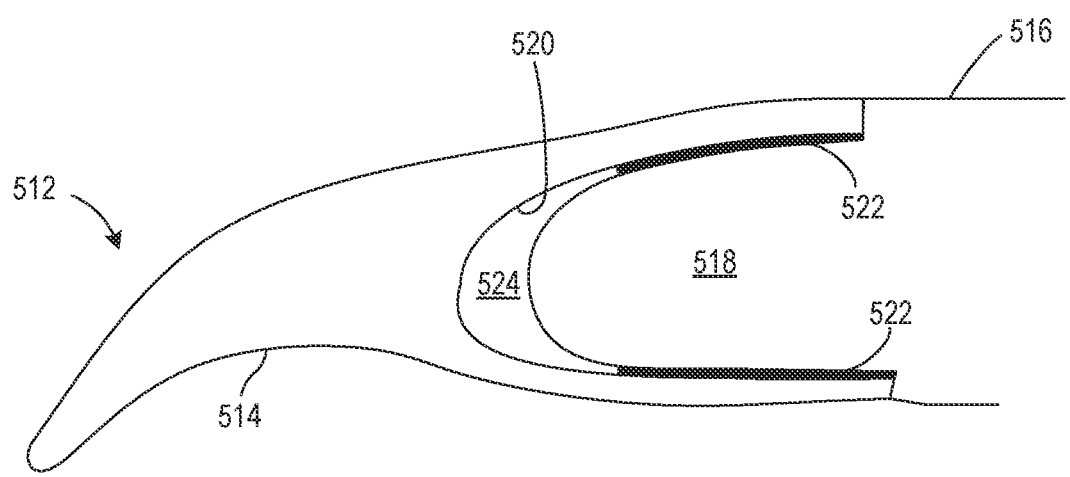
FIG. 5B illustrates a second example construction of a joint of a second example integrated FES-fan frame strut.

FIG. 5B illustrates a second example construction of a joint of a second example integrated FES-fan frame strut 512. The second example integrated FES-fan frame strut 512 includes an FES portion 514 and a fan frame strut portion 516. The fan frame strut portion 516 includes a tongue 518 along a leading edge of the fan frame strut portion 516. The tongue 518 is disposed within a cavity 520. The cavity 520 is a portion of the trailing edge of the FES portion 514. Disposed between a portion of the tongue 518 and the cavity 520 is an adhesive 522. Additionally, a hollow cavity 524 is maintained between the tongue 518 and the cavity 520 of the FES portion 514 when the second example integrated FES-fan frame strut 512 is assembled. The hollow cavity 524 is an air-filled space which allows for expansion and/or contraction of the FES portion 514 and/or the fan frame strut portion 516 while maintaining the joint of the second example integrated FES-fan frame strut 512 during, for example, operation of a gas turbine engine (e.g., the turbofan 100).

Figure 5C:
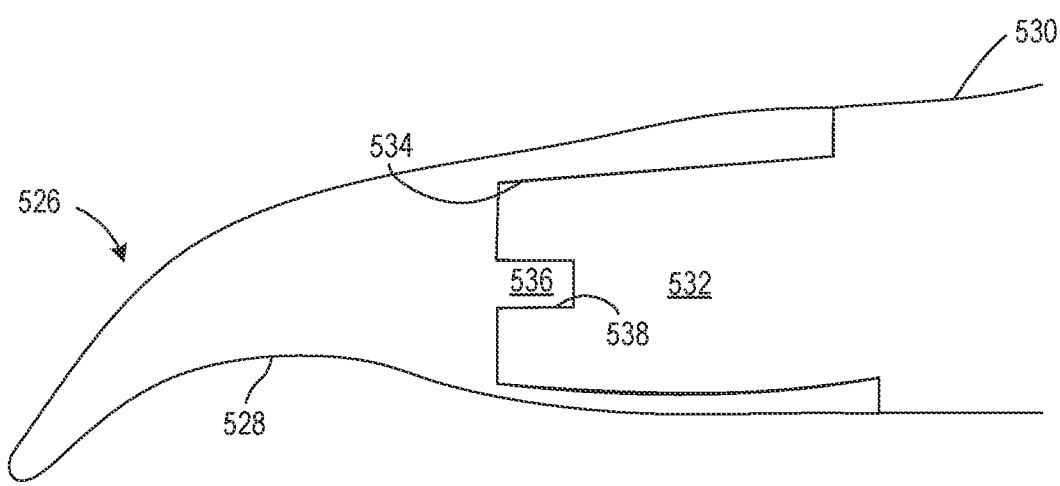
FIG. 5C illustrates a third example construction of a joint of a third example integrated FES-fan frame strut.

FIG. 5C illustrates a third example construction of a joint of a third example integrated FES-fan frame strut 526. The third example integrated FES-fan frame strut 526 includes an FES portion 528 and a fan frame strut portion 530. The fan frame strut portion 530 includes a tongue 532 along a leading edge of the fan frame strut portion 530. The tongue 532 is disposed within a cavity 534. The cavity 534 is a portion of the trailing edge of the FES portion 528. In the example of FIG. 5C, the cavity 534 of the FES portion 528 includes a key 536. The example key 536 is disposed within a keyway 538 along the leading edge of the tongue 532 of the fan frame strut portion 530. The example key 536 and the example keyway 538 provide for enhanced engagement between the FES portion 528 and the fan frame strut portion 530.

In some examples, the apparatus includes means for directing air. For example, the means for directing air may be implemented by the FES portion 303. In some examples, the apparatus includes means for supporting a fan section. For example, the means for supporting a fan section may be implemented by the fan frame strut portion 305. In some examples, the apparatus includes means for means for adhering. For example, the means for adhering may be implemented by the adhesive 510 and/or the adhesive 522. In some examples, the apparatus includes means for receiving. For example, the means for receiving may be implemented by the cavity 508, the cavity 520, and/or the cavity 534. In some examples, the apparatus includes means for assembling. For example, the means for assembling may by implemented by the tongue 506, the tongue 518, and/or the tongue 532. In some examples, the apparatus includes means for expansion. For example, the means for expansion may be implemented by the hollow cavity 524. In some examples, the apparatus includes means for engagement. For example, the means for engagement may be implemented by the key 536. In some examples, the apparatus includes means for receiving a key. For example, the means for receiving a key may be implemented by the keyway 538.

From the foregoing, it will be appreciated that example systems, methods, apparatus, and articles of manufacture have been disclosed that provide for an integrated stator-fan frame assembly which results in a reduced LP shaft length in a gas turbine engine. The reduced LP shaft length in the gas turbine engine provides for reduced engine size and mass while maintaining technical performance (e.g., thrust). Additionally or alternatively, the integrated stator-fan frame assembly can increase a duct area downstream of a fan section. The increased duct area can reduce a flow velocity of air through the duct and, thus, reduce duct skin friction losses.

Example methods, apparatus, systems, and articles of manufacture to implement an integrated stator-fan frame assembly are disclosed herein. Further examples and combinations thereof include the following:

Example 1 includes an integrated fan exit stator-fan frame strut assembly for a gas turbine engine, the integrated fan exit stator-fan frame strut assembly comprising a fan exit stator portion having an airfoil including a leading edge and a trailing edge; and a fan frame strut portion including a leading edge and a trailing edge, the leading edge of the fan frame strut portion aerodynamically integrated with the trailing edge of the fan exit stator portion.

Example 2 includes the integrated fan exit stator-fan frame strut assembly of any preceding clause, further including an adhesive disposed between the fan exit stator portion and the fan frame strut portion.

Example 3 includes the integrated fan exit stator-fan frame strut assembly of any preceding clause, wherein the fan exit stator portion is mechanically separable from the fan frame strut portion.

Example 4 includes the integrated fan exit stator-fan frame strut assembly of any preceding clause, wherein the fan exit stator portion includes a cavity along the trailing edge of the fan exit stator portion and the fan frame strut portion includes a tongue along the leading edge of the fan frame strut portion, the tongue disposed within the cavity.

Example 5 includes the integrated fan exit stator-fan frame strut assembly of any preceding clause, further including a hollow cavity between the tongue and the fan exit stator portion when the integrated fan exit stator-fan frame strut assembly is assembled.

Example 6 includes the integrated fan exit stator-fan frame strut assembly of any preceding clause, wherein the cavity includes a key and the tongue includes a keyway cavity.

Example 7 includes a fan section of a gas turbine engine, comprising an array of fan blades; an array of fan exit stators, each of the fan exit stators including an airfoil including a leading edge and a trailing edge; and a plurality of fan frame struts, each of the fan frame struts including a leading edge and a trailing edge, the leading edge of each of the fan frame struts aerodynamically integrated into the trailing edge of a first portion of the fan exit stators.

Example 8 includes the fan section of any preceding clause, wherein the leading edge of each of the fan frame struts is mechanically separable from the trailing edge of the first portion of the fan exit stators.

Example 9 includes the fan section of any preceding clause, wherein each one of the first portion of the fan exit stators includes a cavity along the trailing edge and each one of the fan frame struts includes a tongue along the leading edge, the tongue disposed within the cavity.

Example 10 includes the fan section of any preceding clause, wherein a quantity of the fan frame struts is less than a quantity of the fan exit stators.

Example 11 includes the fan section of any preceding clause, wherein the array of fan exit stators are disposed axially in a direction of airflow from the array of fan blades and the plurality of fan frame struts is disposed axially in the direction of airflow from the array of fan exit stators.

Example 12 includes the fan section of any preceding clause, wherein a first portion of the plurality of the fan frame struts has a first shape and a second portion of the plurality of the fan frame struts has a second shape.

Example 13 includes the fan section of any preceding clause, wherein the gas turbine engine includes a central axis of rotation and the leading edge of each of the fan frame struts is perpendicular to the central axis of rotation.

Example 14 includes a gas turbine, comprising a compressor; a combustion section; a turbine; a shaft to rotatably couple the compressor and the turbine; and a fan section, the fan section including an array of fan blades; an array of fan exit stators, each of the fan exit stators including an airfoil including a leading edge and a trailing edge; and a plurality of fan frame struts, each of the fan frame struts including a leading edge and a trailing edge, the leading edge of each of the fan frame struts aerodynamically integrated into the trailing edge of a first portion of the fan exit stators.

Example 15 includes the gas turbine of any preceding clause, further including a second shaft to rotatably couple the compressor and the fan section, the second shaft to rotatably couple the compressor and the fan section including a compressor shaft portion and a fan shaft portion.

Example 16 includes the gas turbine of any preceding clause, wherein the gas turbine includes a reduction gearbox to reduce a speed of the fan shaft portion relative to the compressor shaft portion.

Example 17 includes the gas turbine of any preceding clause, wherein the leading edge of each of the fan frame struts is mechanically separable from the trailing edge of the first portion of the fan exit stators.

Example 18 includes the gas turbine of any preceding clause, wherein each one of the first portion of the fan exit stators includes a cavity along the trailing edge and each one of the fan frame struts includes a tongue along the leading edge, the tongue disposed within the cavity.

Example 19 includes the gas turbine of any preceding clause, wherein a quantity of the fan frame struts is less than a quantity of the fan exit stators.

Example 20 includes the gas turbine of any preceding clause, wherein the array of fan exit stators are disposed axially in a direction of airflow from the array of fan blades and the plurality of fan frame struts is disposed axially in the direction of airflow from the array of fan exit stators.

Example 21 includes the integrated fan exit stator-fan frame strut assembly of any preceding clause, wherein the leading edge of the fan exit stator portion is leaned.

Example 22 includes the gas turbine of any preceding clause, wherein the gas turbine engine includes a central axis of rotation and the leading edge of each of the fan frame struts is non-perpendicular to the central axis of rotation.

Example 23 includes the fan section of any preceding clause, wherein each of the fan blades includes a root attachment portion, a chord length of each of the fan blades defined by a distance between a leading edge of the fan blade to a trailing edge of a fan blade, an axial length of the root attachment portion less than the chord length.

Example 24 includes the fan section of any preceding clause, wherein a first portion of the array of fan exit stators has a first shape and a second portion of the array of fan exit stators has a second shape.

Example 25 includes the fan section of any preceding clause, wherein the leading edge of at least one of the fan exit stators is swept.

Example 26 includes the fan section of any preceding clause, wherein each fan exit stator of the array of fan exit stators has a unique shape compared to each of the other fan exit stators of the array of fan exit stators.

Example 27 includes the fan section of any preceding clause, wherein a first portion of the array of fan exit stators has a first camber and a second portion of the array of fan exit stators has a second camber.

Example 28 includes the fan section of any preceding clause, wherein each fan exit stator of the array of fan exit stators has a unique camber compared to each of the other fan exit stators of the array of fan exit stators.

Example 29 includes the fan exit stator of any preceding clause, wherein a first fan exit stator of the array of fan exit stators has a unique shape compared to a second fan exit stator radially near most the first fan exit stator in a positive direction and a third fan exit stator radially near most the first exit stator in a negative direction.

Example 30 includes the fan exit stator of any preceding clause, wherein a first fan exit stator of the array of fan exit stators has a unique camber compared to a second fan exit stator radially near most the first fan exit stator in a positive direction and a third fan exit stator radially near most the first exit stator in a negative direction.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An integrated fan exit stator-fan frame strut assembly for a gas turbine engine, the integrated fan exit stator-fan frame strut assembly comprising:
   a fan exit stator portion having a first airfoil including a first leading edge and a first trailing edge, the first airfoil associated with a first row of stators; and
   a fan frame strut portion including a second leading edge and a second trailing edge, the second leading edge of the fan frame strut portion aerodynamically integrated with the first trailing edge of the fan exit stator portion, the fan frame strut portion positioned upstream of a compressor of the gas turbine engine, the second trailing edge separated from a third leading edge of a second airfoil by a gap in an axial direction defined by the gas turbine engine downstream of the second trailing edge, the second airfoil associated with a second row of stators downstream of and adjacent to the first row of stators, a pressure surface defined on a first side of the fan exit stator portion and the fan frame strut portion between the first leading edge and the second trailing edge, and a suction surface defined on a second side opposite the first side; and
   an adhesive disposed between the fan exit stator portion and the fan frame strut portion, the adhesive separated from the pressure surface and the suction surface by the fan exit stator portion or the fan frame strut portion.

2. The integrated fan exit stator-fan frame strut assembly of claim 1, wherein the fan exit stator portion is mechanically separable from the fan frame strut portion.

3. The integrated fan exit stator-fan frame strut assembly of claim 1, wherein the fan exit stator portion includes a cavity along the first trailing edge of the fan exit stator portion and the fan frame strut portion includes a tongue along the second leading edge of the fan frame strut portion, the tongue disposed within the cavity.

4. The integrated fan exit stator-fan frame strut assembly of claim 3, further including a hollow cavity between the tongue and the fan exit stator portion when the integrated fan exit stator-fan frame strut assembly is assembled.

5. The integrated fan exit stator-fan frame strut assembly of claim 3, wherein the cavity includes a key and the tongue includes a keyway cavity.

6. The integrated fan exit stator-fan frame strut assembly of claim 3, wherein the tongue and the cavity extend from an inner radial surface to an outer radial surface of an axial flow path defined between a core and a casing of the gas turbine engine.

7. A fan section of a gas turbine engine, comprising:
   an array of fan blades;
   an array of fan exit stators, each of the fan exit stators including a first airfoil including a first leading edge and a first trailing edge, the fan exit stators positioned upstream of a compressor of the gas turbine engine and within a cross-sectional area of a turbine casing;
   an array of second airfoils downstream of the array of fan exit stators, each of the second airfoils including a second leading edge and a second trailing edge, the array of second airfoils defining a row adjacent to at least a portion of the fan exit stators;
   a plurality of fan frame struts, each of the fan frame struts including a third leading edge and a third trailing edge, the third leading edge of each of the fan frame struts aerodynamically integrated into the first trailing edge of a first portion of the fan exit stators, the third trailing edge of each of the fan frame struts separated from the second leading edge of the second airfoils in an axial direction defined by the gas turbine engine downstream of the third trailing edge; and
   an adhesive between the third leading edge and the first trailing edge, a portion of the fan exit stator to separate the adhesive from a pressure surface and a suction surface defined between the first leading edge and the third trailing edge.

8. The fan section of claim 7, wherein the second leading edge of each of the fan frame struts is mechanically separable from the first trailing edge of the first portion of the fan exit stators.

9. The fan section of claim 7, wherein each one of the first portion of the fan exit stators includes a cavity along the second trailing edge and each one of the fan frame struts includes a tongue along the first leading edge, the tongue disposed within the cavity.

10. The fan section of claim 7, wherein a quantity of the fan frame struts is less than a quantity of the fan exit stators.

11. The fan section of claim 7, wherein the array of the fan exit stators is disposed axially in a direction of airflow from the array of the fan blades and the plurality of fan frame struts is disposed axially in the direction of the airflow from the array of the fan exit stators.

12. The fan section of claim 7, wherein a first portion of the plurality of the fan frame struts has a first shape and a second portion of the plurality of the fan frame struts has a second shape.

13. The fan section of claim 7, wherein a first portion of the array of the fan exit stators has a first shape and a second portion of the array of the fan exit stators has a second shape.

14. A gas turbine, comprising:
   a compressor including a row of airfoils;
   a combustion section;
   a turbine;

a turbine casing positioned around the compressor, the combustion section, and the turbine, the turbine casing defining a split between a bypass airflow passage and a compressor airflow passage;

a shaft to rotatably couple the compressor and the turbine; and a fan section, the fan section including:
- an array of fan blades;
- an array of fan exit stators positioned in the compressor airflow passage upstream of the row of airfoils, the row of airfoils adjacent to at least a portion of the fan exit stators, each of the fan exit stators including an airfoil including a first leading edge and a first trailing edge;
- a plurality of fan frame struts positioned in the compressor airflow passage and the bypass airflow passage, each of the fan frame struts including a second leading edge and a second trailing edge, the second leading edge of each of the fan frame struts aerodynamically integrated into the first trailing edge of a first portion of the fan exit stators, the second trailing edge separated from third leading edges of the row of airfoils by a gap in an axial direction defined by the gas turbine downstream of the second trailing edge; and
- an adhesive to couple the fan frame struts to the fan exit stators, the adhesive positioned at least partially between the first trailing edge and the second leading edge, the fan exit stators or the fan frame struts to separate the adhesive from a suction surface and a pressure surface defined between the first leading edge and the second trailing edge.

15. The gas turbine of claim 14, further including a second shaft to rotatably couple the compressor and the fan section, the second shaft to rotatably couple the compressor and the fan section including a compressor shaft portion and a fan shaft portion.

16. The gas turbine of claim 15, wherein the gas turbine includes a reduction gearbox to reduce a speed of the fan shaft portion relative to the compressor shaft portion.

17. The gas turbine of claim 14, wherein the second leading edge of each of the fan frame struts is mechanically separable from the first trailing edge of the first portion of the fan exit stators.

18. The gas turbine of claim 14, wherein each one of the first portion of the fan exit stators includes a cavity along the first trailing edge and each one of the fan frame struts includes a tongue along the second leading edge, the tongue disposed within the cavity.

19. The gas turbine of claim 14, wherein a quantity of the fan frame struts is less than a quantity of the fan exit stators.

20. The gas turbine of claim 14, wherein the array of the fan exit stators are disposed axially in a direction of airflow from the array of the fan blades and the plurality of fan frame struts is disposed axially in the direction of the airflow from the array of the fan exit stators.

21. An integrated fan exit stator-fan frame strut assembly for a gas turbine engine, the integrated fan exit stator-fan frame strut assembly comprising:
- a fan exit stator portion having an airfoil including a first leading edge and a first trailing edge; and
- a fan frame strut portion including a second leading edge and a second trailing edge, the second leading edge of the fan frame strut portion aerodynamically integrated with the first trailing edge of the fan exit stator portion, the fan exit stator portion including a cavity along the first trailing edge of the fan exit stator portion and the fan frame strut portion including a tongue along the second leading edge of the fan frame strut portion, the tongue disposed within the cavity, a hollow cavity defined between the tongue and the fan exit stator portion when the integrated fan exit stator-fan frame strut assembly is assembled.

22. An integrated fan exit stator-fan frame strut assembly for a gas turbine engine, the integrated fan exit stator-fan frame strut assembly comprising:
- a fan exit stator portion having an airfoil including a first leading edge and a first trailing edge, the fan exit stator portion defining a cavity along the first trailing edge, the cavity including a key; and
- a fan frame strut portion including a second leading edge and a second trailing edge, the second leading edge of the fan frame strut portion aerodynamically integrated with the first trailing edge of the fan exit stator portion, the fan frame strut portion including a tongue along the second leading edge, the tongue disposed within the cavity, the tongue including a keyway cavity, the key positioned in the keyway cavity.

* * * * *